[11] 3,620,589

[72] Inventors Thomas Dixon Dudderar
 Madison;
 Richard O'Regan, Summit, both of N.J.
[21] Appl. No. 70,409
[22] Filed Sept. 8, 1970
[45] Patented Nov. 16, 1971
[73] Assignee Bell Telephone Laboratories, Incorporated
 Murray Hill, Berkeley Heights, N.J.

[54] INTERFEROMETRY OF TRANSPARENT OBJECTS
 18 Claims, 1 Drawing Fig.
[52] U.S. Cl. .................................................. 350/3.5, 356/33
[51] Int. Cl. .................................................. G02b 27/22, G01b 11/18
[50] Field of Search .................................................. 350/3.5; 356/33, 106

[56] References Cited
 UNITED STATES PATENTS
 3,561,838  2/1971  Gabor .................................................. 350/3.5

OTHER REFERENCES
Review of Scientific Instruments, " Holographic Interferometer for Isopachic Stress Analysis" p. 1789 (12/1968).

*Primary Examiner*—David Schonberg
*Assistant Examiner*—Robert L. Sherman
*Attorneys*—R. J. Guenther and Arthur J. Torsiglieri ABSTRACT: A method and apparatus have been devised for separating information related to the sums of the principal stresses in an object from information related to the differences between the principal stresses. Illustrative apparatus comprises means for rotating by approximately 90° the electric vector of a beam of radiation from the object, means for imaging this radiation to point-for-point coincidence with the object and means for interfering this beam from the object with a second beam that is a reference. Preferably, this second beam is formed by holographic techniques.

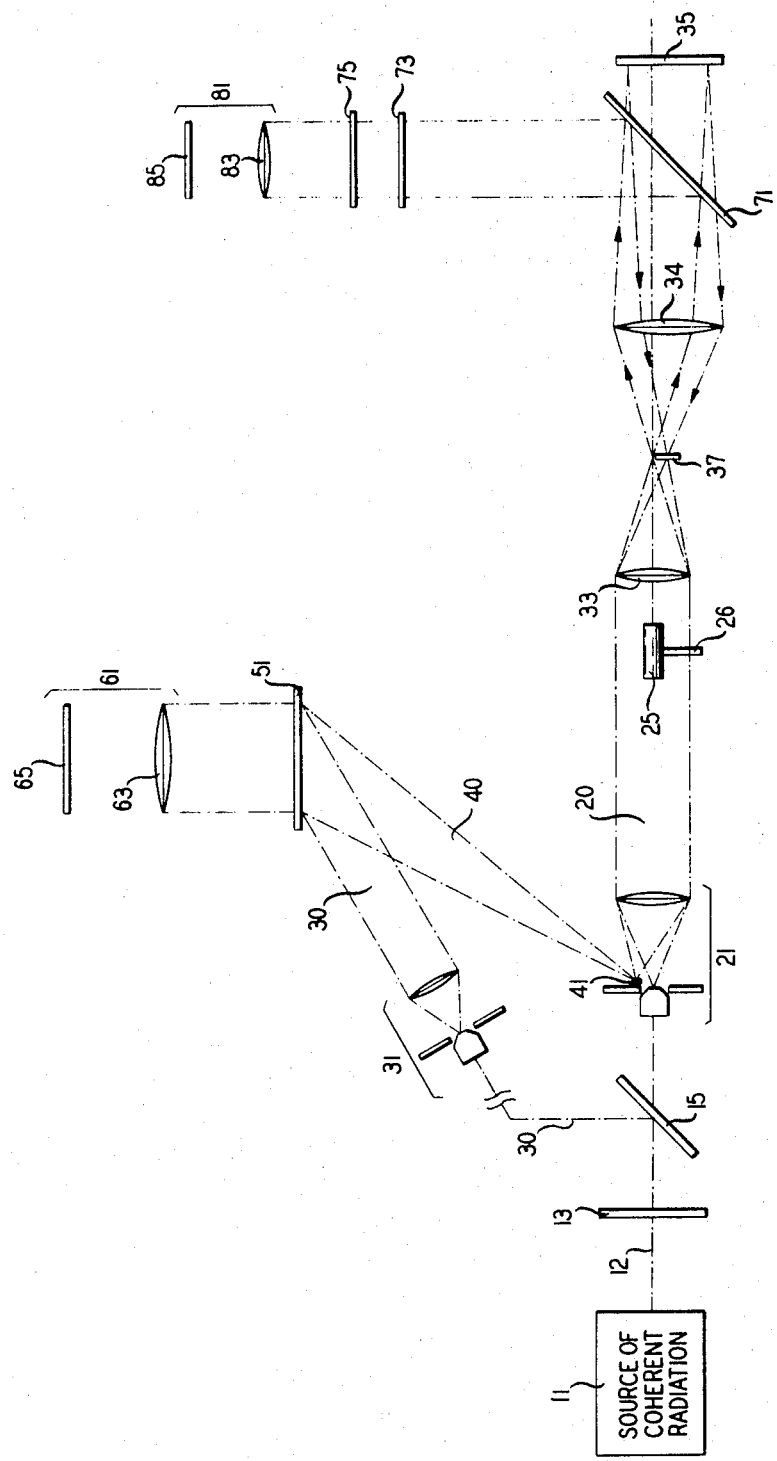

INTERFEROMETRY OF TRANSPARENT OBJECTS

BACKGROUND OF THE INVENTION

This invention relates to interferometry and in particular to interferometry for the study of transparent objects. Preferably this invention is practiced with the techniques and apparatus of holographic interferometry.

When an object is illuminated, it modulates the illuminating beam so as to form a beam of light that carries information representative of the object. A record, called a hologram, can be made of the phase and amplitude of this information-bearing beam by interfering on a recording medium, such as a photographic plate, the wave fronts of the information beam and a phase-related beam. Proper illumination of the hologram reconstructs therefrom the stored information-bearing beam and therefore an image of the stored object.

In holographic interferometry, the reconstructed information-bearing beam acts as a reference and is made to interfere with a second information-bearing beam that is also derived from the same object but only after the object has been altered. The interference pattern that results is a record of the change that has been made in the object. In real-time holographic interferometry, the second information-bearing beam is formed by illuminating the altered object with coherent light; and the interference pattern is formed by simultaneously illuminating the hologram with phase-related coherent light in such a way as to reconstruct an image of the recorded object that is coincident with the altered object. In double-exposure holographic interferometry, two holograms are formed as double exposures, the first exposure being made before the object is altered and the second exposure after alteration. As a result, two information-bearing beams are recorded. The hologram is then illuminated to reconstruct the two information-bearing beams that interfere to form an interference pattern.

It can be shown that the general intensity distribution for an interference pattern formed by real-time holographic interferometry of a transparent test piece under stress may be written $$I = a^2/2 \,(1 + \cos(k(C_1/2)(\sigma_1+\sigma_2)t) \cdot \cos(k(C_2/2)(\sigma_1-\sigma_2)t)) \quad (1)$$

for plane stress where $a$ is a measure of the magnitude of the intensity, $\sigma_1$ and $\sigma_2$ are the principal stresses in the plane of the test piece, $t$ is its thickness under stress and $C_1 = A + B - (2Y/E)(n_o - n_m)$
$C_2 = A - B$.

Here $A$ and $B$ are the stress optic coefficients from the linearized Maxwell-Neumann law, $Y$ and $E$ are the elastic constants of the material, $n_o$ is the index of refraction of the test piece and $n_m$ is the index of refraction of the ambient. This result is the equivalent to that originally obtained by Nisida and Saito for conventional interferometry with birefringment models. See M. Nisida and H. Saito "A New Interferometric Method of Two-Dimensional Stress Analysis," *Experimental Mechanics*, Vol. 8, No. 1, pgs. 33 to 38 (1968). It is also similar to an equation obtained by Fourney and Mate for double-exposure holography. See M. E. Fourney and K. V. Mate "Further Applications of Holography to Photoelasticity," *Experimental Mechanics*, Vol. 10, No. 5, pgs. 177 to 186 (1970).

When the test piece is not birefringent when stressed, $A$ is approximately equal to $B$ and $C_2$ is therefore quite small. Equation (1) then reduces to $$I = K_1 + K_2 \cos(k(C_1/2)(\sigma_1+\sigma_2)t). \quad (2)$$

Consequently, the interference fringes represent the loci of constant principal stress sums, which commonly are called isopachics.

If, however, the test piece is birefringent when stressed, $A$ and $B$ are quite different and $C_2$ is a significant number. Consequently, two interference fringe patterns are seen simultaneously. One of these is the isopachic pattern associated with $(\sigma_1+\sigma_2)$. The other pattern is associated with the $(\sigma_1-\sigma_2)$ term and represents the loci of constant stress differences, which fringes are the isochromatics normally observed in photoelasticity. Because both the sums and the differences of the principal stresses are displayed in the interference pattern, each principal stress may be evaluated. However, the two interference patterns interact with one another in such a way as to make interpretation ambiguous under certain conditions. Typically, this interaction produces a reversal of the intensity of the isopachic fringes from bright to dark or vice versa at each intersection with an isochromatic fringe. In regions where both the isopachic and isochromatic fringe patterns have the same spatial frequency and/or are nearly parallel, their interaction can be quite confusing. See R. J. Sanford and A. J. Durelli, "Interpretation of Fringes in Stress-Holo-Interferometry," 1970 SESA (Society for Experimental Stress Analysis) Spring Meeting.

SUMMARY OF THE INVENTION

Accordingly, it is an object of this invention to facilitate the recording and interpretation of interferograms.

It is a further object of this invention to facilitate the recording and interpretation of interferograms of transparent objects that form both isopachic and isochromatic fringes under stress.

And it is still a further object to facilitate the recording and interpretation of holographic interferograms of objects that are birefringent when stressed.

These and other objects of our invention are achieved by eliminating one of the two sets of fringes formed when the object is under stress. Illustratively, this is accomplished by directly one of two mutually coherent beams of radiation through the object, rotating its electric vector by approximately 90°, imaging the beam back through the object and forming a hologram of the resulting beam. This process is sufficient to eliminate the isochromatic from the isopachic interference pattern. It is also possible to eliminate the isopachic from the isochromatic interference pattern by directing the beam from the object through a properly oriented quarterwave plate and analyzer.

DETAILED DESCRIPTION OF THE DRAWING

These and other objects and features of the invention will become more readily apparent from the following detailed description of the drawing of a schematic representation of an illustrative embodiment of the invention.

For convenience of discussion, this embodiment may be regarded as being comprised of means for forming two mutually coherent beams of electromagnetic radiation, one of which is a reference beam and the other of which is incident on an object to be studied, means for rotating the electric vector of the beam that is incident on the object and imaging this beam back upon the object, and means for interfering the beam from the object with the reference beam.

The means for forming two beams of radiation comprises a source 11 of coherent radiation and a beam splitter 15 for dividing a beam of radiation 12 into two beams, which may be termed an illuminating beam 20 and a reference beam 30. This means also comprises conventional beam expanding means 21 in the path of beam 20 and similar beam expanding means 31 in the path of beam 30. Typically, the beam expanding means are comprised of an objective lens, a pin hole and a collimating lens. Beams 20 and 30 preferably are circularly polarized to permit the simultaneous acquisition of isopachic and isochromatic fringes at different points in the apparatus. Accordingly, if source 11 of radiation produces a beam that is plane polarized, a quarterwave plate 13 is positioned in beam 12 to make it circularly polarized.

Illuminating beam 20 is incident on an object 25 that is positioned in the beam by supporting means 26. Object 25 ordinarily is a transparent birefringent object that is studied by subjecting it to varying stresses. Typically, the means for stressing object 25 is incorporated in supporting means 26 but it obviously could be independent of means 26 if so desired.

The means for rotating the electric vector of the beam and for forming an image of the object comprises a first lens 33 that converges the beam to a narrow waist, a second lens 34 that expands the beam, a reflecting surface 35, and means 37 for rotating the electric vector of the beam. Lenses 33 and 34 have focal lengths and positions appropriate for forming a first image of the object near reflecting surface 35 and for forming a second image of the object that is approximately coincident point-for-point with object 25. In addition, lenses 33 and 34 are positioned so that the beam of radiation passes through rotating means 37 only once. This can be accomplished simply by locating lens 34 slightly off axis. Rotating means 37 typically is a conventional quartz 90° polarization rotator.

The means for interfering reference beam 30 and the beam from the object, which is shown as beam 40, comprises a mirror 41 that is mounted near beam expanding means 21 on the side of the pinhole facing the collimating lens. Because lenses 33 and 34 are positioned to skew the beam from the object 25 so that it passes through rotator 37 only once, beam 40 does not travel the same path as beam 20 and does not go through the pinhole in expanding means 21. Rather it is incident on mirror 41 that redirects it to interfere with reference beam 30. The resulting interference pattern is recorded as a hologram on a suitable recording medium 51.

The optical path length from beam splitter 15 through object 25 to recording medium 51 must not differ from the path length of reference beam 30 from beam splitter 15 to recording medium 51 by more than the coherence length of the source of radiation. To avoid difficulties, it is recommended that these path lengths be approximately equal. To symbolize this equality of path lengths, an interruption is shown in the path of beam 30.

For recording interference patterns formed with holographic techniques, a camera 61 is located behind recording medium 51. Camera 61 is comprised of a lens system 63 and a recording medium 65. Preferably, the lens system is focused to image object 25 onto recording medium 65.

The apparatus may also include a beam splitter 71 and a conventional polariscope comprised of a quarterwave plate 73 and a polarization analyzer 75. The output of the polariscope is also ordinarily recorded on a camera that is shown here as element 81. Again, the camera is comprised of a lens system 83 and a recording medium 85 and the lens system is focused to image object 25 onto recording medium 85.

To practice our invention using the techniques of real-time hologram interferometry, a reference hologram is formed of the object under an initial condition and then an image reconstructed from this hologram is interfered with the object under a second condition. The reference hologram is formed by illuminating object 25 in its initial condition with a beam 20 of radiation, by imaging the beam from the object back upon the object, and by interfering this beam with a reference beam 30. In the case where object 25 in its initial condition is not under stress, it is not necessary to rotate the electric vector of the beam from the object because no isopachic or isochromatic fringe patterns are created in the absence of stress. However, if object 25 is under stress in its initial condition, then it is necessary to rotate the electric vector by approximately 90° prior to imaging the beam back upon the object.

The interference pattern formed by the beam from the object and reference beam 30 is recorded as a hologram on recording medium 51. After the recording medium is exposed, it is developed, if necessary, and replaced in exactly the same position it was in when the hologram was recorded. Alternatively, the recording medium can be developed in place to form the hologram. Consequently, if the hologram is illuminated by a reconstructing beam that is similar to reference beam 30, the hologram reconstructs an image of object 25 that is coincident with object 25.

Accordingly, to compare the object in its initial condition as recorded on the hologram with the object in its second condition, object 25 is changed to its second condition and an illuminating beam is directed at the object while a reference beam is directed at the hologram. The illuminating beam passes through the object, is imaged back upon the object, and is then incident on the hologram. In addition, when object 25 is under stress in its second condition, the electric vector of the beam is rotated by approximately 90° before the beam is imaged back on the object. As a result, a set of isopachic fringes are formed that are a measure of the change in stress applied to the object between its initial condition and its second condition.

These isopachic fringes can be photographed simply by exposing recording medium 65 in camera 61 to the radiation transmitted through hologram 51.

If it is desired to record a set of isochromatic fringes, these can be obtained at the same time the isopachics are recorded provided beam 30 is circularly polarized. The isochromatic recording apparatus comprises beam splitter 71, quarterwave plate 73, analyzer 75 and camera 81. Part of the beam from object 25 is merely directed through a properly oriented quarterwave plate and analyzer before the electric vector of the beam is rotated. The isochromatic fringes are then recorded simply by exposing recording medium 85 to this part of the beam.

This polariscope may also be located at other places along the optical path from object 25 to recording medium 51. For example, beam-splitter 71 could be located between mirror 41 and recording medium 51. For such a location, isochromatic fringes will be observed in the polariscope if polarization rotator 37 is set to rotate the electric vector of the beam by any integral multiple of $\pi$. The frequency of these fringes will be twice that of the fringes formed with the polariscope located where it is shown in the drawing.

For an explanation of why it is possible to separate the isopachic from the isochromatic fringes, it is necessary to consider the effect that is produced when a beam of electromagnetic radiation is incident on a birefringent object. A beam of electromagnetic radiation is comprised of transverse waves in which the oscillating components are the electric and magnetic vectors. For our purposes, it is appropriate to confine our discussion to the electric vector. By conventional methods any particular value of the electric vector can be resolved onto two orthogonal components; and, in general, the electric vector can be thought of as comprised of two vectors that are oriented in orthogonal directions. Extensive discussion of this treatment of electric vectors can be found in most standard optics textbook, such as Jenkins and White's *Fundamentals of Optics* (McGraw Hill 1957).

When a beam of radiation is incident on a birefringent object, it is observed in all but a few special cases that the two orthogonal components of the electric vector have a different velocity through the birefringent object. For purposes of analysis, it is convenient to assume that the directions of the two orthogonal components of the electric vector are the same as the directions of the two principal stresses, $\sigma_1$ and $\sigma_2$, in the object. In such a case it can be shown that $$n_1 - n_o = A\sigma_1 + B\sigma_2 \quad (3)$$
$$n_2 - n_o = B\sigma_1 + A\sigma_2$$

where $n_o$ is the index of refraction of the object with no stress applied, $n_1$ and $n_2$ are the indices of refraction of the object in the directions of $\sigma_1$ and $\sigma_2$ respectively, and $A$ and $B$ are the stress optic coefficients from the linearized Maxwell-Neumann law. Because each component of the electric vector propagates through the object at a different velocity, each component has a different optical path length.

However, when the electric vector of a beam that has passed through the object is rotated by 90° and the beam is directed back through the object to form an image that is approximately coincident with the object, that component of the electric vector that traveled the first path length on the first passage through the object travels the second path length on the second passage through the object. Similarly, that component that traveled the second path length on the first passage travels the first path length on the second passage. As a result, the optical path length for each of the two components is the same after an initial passage through the object, rotation of the electric vector by 90° and a second passage through the object.

Because the isochromatic fringe pattern is directly related to the difference in the path lengths of the two components of the electric vector, the absence of any difference in the path lengths eliminates the isochromatic fringe pattern. Consequently, the isopachic fringe pattern of the object is observed free of any confusion that might be introduced by the isochromatic fringe pattern.

While the foregoing analysis applies whether the beam is polarized or unpolarized, the same is not the case for the formation of the isochromatics. These fringes are observed with the polariscope only if the beam of radiation is plane polarized or circularly polarized. Moreover, if the beam is plane polarized, the fringe pattern that is observed is a combination of the isochromatics with another group of fringes called the isoclinics. Hence to form just the isopachics and the isochromatics simultaneously, we use circularly polarized radiation.

As indicated above, the use of the 90° quartz rotator to rotate the electric vector of the beam requires that lenses 33 and 34 be positioned so that the beam of radiation from the object passes through the rotator only once. As a result, even though the object and its image are superimposed, the returning beam does not retrace through the object precisely its initial path through it; and the returning beam is incident on mirror 41 rather than the pinhole in beam expanding means 20. In most applications, this effect can be limited to a misalignment of ±1 mil, which is of little significance to the study of the fringe pattern. However, for a thick specimen and high stress gradients, this misalignment can be a problem.

This problem can be eliminated by using a 45° Faraday rotator with a perfectly aligned lens and reflecting system that returns the beam to the object over exactly the same path it traveled from the object. Such a system is realized by centering lenses 33 and 34 on the same optical axis that is also perpendicular to surface 35, by spacing lenses 33 and 34 by the sum of their focal lengths, and by locating the Faraday rotator at the common focal point of lenses 33 and 34. The Faraday rotator utilizes an active optical element such as dysprosium-doped glass. When this element is mounted in a DC solenoid that generates a constant magnetic field, a rotation of the electric vector of an incident beam of radiation is produced that is proportional to the strength of the magnetic field. Because this rotator is located in both the path of the beam that is incident on reflecting surface 35 and the beam that returns from this surface, the magnetic field is adjusted to make the rotation of the electric vector equal to 45° for each pass of the beam and a total rotation of 90° is achieved. Because the beam is returned over exactly the same path it traveled from the object, it is directed to the pinhole in beam expanding means 20 and not to mirror 41. Accordingly, to direct beam 40 at recording medium 51, it is necessary to insert a beam splitter into the path of the beam after its second passage through object 25. Preferably, this beam splitter is located between object 25 and the collimating lens of beam expanding means 20; and an output lens is located between the beam splitter and recording medium 51.

If desired, our invention can also be used with the techniques of double-exposure holography. The apparatus and procedures are similar to those of real-time holography but two holograms are formed instead of one. Thus, the first hologram is formed of the object under its initial condition following exactly the same procedure detailed for forming the hologram of the object in real-time holography. However, after this hologram is recorded on medium 51, medium 51 is not developed. Rather, the object is changed to produce its second condition and a second hologram is formed of the object in this second condition. After this hologram is recorded, the recording medium is then developed. If the hologram is then illuminated by a replica of the reference beam used in forming it, two information-bearing beams will be reconstructed. One of these beams will be a replica of the beam from the object under its initial condition and the other will be a replica of the beam from the object under its second condition. These two beams will interfere to form an interference pattern representative of the stresses in the object. By following the same procedures for rotating the electric vector of the beams that were detailed in conjunction with the description of real-time holography, it is possible to separate the isopachic from the isochromatic fringes.

Numerous modifications can readily be made in our invention. Several of these have been detailed above. Others might include different schemes for rotating the electric vector of the beam and forming an image of the object or for interfering the beam from the object with the reference beam. In particular, a diffuse screen can be located in beam 40 between mirror 41 and recording medium 51 during both the recording of the hologram and the real-time reconstruction. Such a screen will minimize the effects of small imperfections in the object. If desired, numerous apparatus useful in the study of stresses may readily be coupled to the basic apparatus we have described above.

What is claimed is:

1. A method for separating information related to the sums of principal stresses in an object from information related to the differences between principal stresses comprising the steps of:
    directing through the object when it is in a first condition a first beam of coherent radiation;
    rotating the electric vector of said beam by approximately 90° and directing the rotated beam back through the object to form an image of the object that is approximately coincident point-for-point with the object; and
    interfering the rotated beam from the object with a second beam of phase related coherent radiation to form a first set of isopachic interference fringes representative of the sums of the principal stresses in the object.

2. The method of claim 1 wherein the second beam of phase related coherent radiation is formed by reconstructing the beam from a hologram that is formed by the steps of:
    directing through the object when it is in a second condition a third beam of coherent radiation;
    directing said beam back through the object to form an image of the object that is approximately coincident point-for-point with the object; and
    interfering the beam after its second passage through the object with a fourth beam of phase related coherent radiation and recording an interference pattern thereby produced.

3. The method of claim 2 wherein the step of forming the hologram further comprises the step of rotating by approximately 90° the electric vector of the third beam of coherent radiation after said beam is directed through the object but before said beam is directed back through the object to form the image that is coincident with the object.

4. The method of claim 1 further comprising the steps of:
    making a record of the set of interference fringes formed by the interference of the rotated beam and the second beam of coherent radiation;
    directing through the object when it is in a second condition a third beam of coherent radiation;
    directing said beam back through the object to form an image of the object that is approximately coincident point-for-point with the object; and
    interfering the beam after its second passage through the object with a fourth beam of phase related coherent radiation reconstructed from said record.

5. The method of claim 4 further comprising the step of rotating by approximately 90° the electric vector of the third beam of coherent radiation after said beam is directed through the object when it is in its second condition but before said beam is directed back through the object to form the image that is coincident with the object.

6. The method of claim 1 further comprising the steps of:
    directing through the object when it is in a second condition a third beam of coherent radiation;

rotating the electric vector of said beam by approximately 90° and directing the rotated beam back through the object to form an image of the object that is approximately coincident point-for-point with the object;

interfering the rotated beam from the object with a fourth beam of phase related coherent radiation to form a second set of interference fringes representative of the sums of the principal stresses in the object in its second condition; and recording both sets of fringes on a recording medium.

7. A hologram formed by the method of claim 6.

8. The method of claim 1 further comprising the steps of:

directing through the object when it is in a second condition a third beam of coherent radiation;

directing said beam back through the object to form an image of the object that is approximately coincident point-for-point with the object;

interfering the beam after its second passage through the object with a fourth beam of phase related coherent radiation to form a second set of interference fringes representative of the object in its second condition; and recording both sets of fringes on a recording medium.

9. A hologram formed by the method of claim 8.

10. A hologram formed by recording the first set of interference fringes formed by the method of claim 1.

11. The method of claim 1 wherein the first beam of coherent radiation is circularly polarized further comprising the steps of:

forming from the first beam of radiation a fifth beam of radiation after the first beam is directed through the object but before its electric vector is rotated; and directing said fifth beam through a polariscope to form a set of isochromatic fringes representative of the differences between principal stresses in the object.

12. Apparatus for separating information related to the sums of principal stresses in an object from information related to the differences between principal stresses comprising:

means for directing through the object to be studied a first beam of coherent radiation;

means for rotating the electric vector of said beam by approximately 90° and directing the rotated beam back through the object to form an image of the object that is approximately coincident point-for-point with the object; and means for interfering the rotated beam from the object with a second beam of phase related coherent radiation to form a set of isopachic interference fringes representative of the sums of the principal stress in the object.

13. The apparatus of claim 12 wherein the means for rotating the electric vector and directing the rotated beam back through the object to form an image comprises:

first and second lenses and a reflecting surface in the path of the beam from the object, said lenses being spaced apart by approximately the sum of their focal lengths and means for rotating the electric vector of the beam located between the first and second lenses at a distance from the first lens that is approximately equal to its focal length.

14. The apparatus of claim 13 wherein the focal lengths of the lenses and the distances of the object and the reflecting surface from the lenses are such that the lenses form an image of the object near the reflecting surface.

15. The apparatus of claim 14 wherein the lenses and reflecting surface are oriented so that a beam of radiation from the object that is reflected back to the object to form an image coincident with it passes through the means for rotating the electric vector only once.

16. The apparatus of claim 15 wherein the means for rotating the electric vector comprises a quartz 90° polarization rotator.

17. The apparatus of claim 14 wherein the means for rotating the electric vector is a Faraday rotator and the beam from the object that is reflected back to the object to form an image that is coincident with it passes through the Faraday rotator twice.

18. The apparatus of claim 12 further comprising a beam splitter located in the path of the first beam of radiation and a polariscope located in the path of the beam formed from the first beam by the beam splitter for forming a set of isochromatic fringes representative of the differences between the principal stresses in the object.

* * * * *